United States Patent
Ito et al.

(10) Patent No.: US 11,618,678 B2
(45) Date of Patent: Apr. 4, 2023

(54) METHOD FOR PRODUCING SULFIDE SOLID ELECTROLYTE

(71) Applicant: Mitsui Mining & Smelting Co., Ltd., Tokyo (JP)

(72) Inventors: Takahiro Ito, Ageo (JP); Masaru Hyakutake, Ageo (JP); Norihiko Miyashita, Ageo (JP)

(73) Assignee: Mitsui Mining & Smelting Co., Ltd.

( * ) Notice: Subject to any disclaimer, the term of this patent is extended or adjusted under 35 U.S.C. 154(b) by 0 days.

(21) Appl. No.: 17/437,185

(22) PCT Filed: Mar. 18, 2020

(86) PCT No.: PCT/JP2020/012095
§ 371 (c)(1),
(2) Date: Sep. 8, 2021

(87) PCT Pub. No.: WO2020/213340
PCT Pub. Date: Oct. 22, 2020

(65) Prior Publication Data
US 2022/0098039 A1  Mar. 31, 2022

(30) Foreign Application Priority Data

Apr. 19, 2019  (JP) .............................. JP2019-079731

(51) Int. Cl.
*C01B 25/14* (2006.01)
*H01M 10/0562* (2010.01)

(52) U.S. Cl.
CPC .......... *C01B 25/14* (2013.01); *H01M 10/0562* (2013.01); *C01P 2006/40* (2013.01); *C01P 2006/80* (2013.01); *H01M 2300/0068* (2013.01)

(58) Field of Classification Search
CPC ......................... C01B 25/14; H01M 10/0562
See application file for complete search history.

(56) References Cited

U.S. PATENT DOCUMENTS

| 2014/0037535 A1* | 2/2014 | Miyashita ............... C01B 17/28 423/566.2 |
| 2016/0156064 A1 | 6/2016 | Miyashita et al. |
| 2016/0164136 A1 | 6/2016 | Higuchi et al. |
| 2017/0222257 A1 | 8/2017 | Miyashita et al. |

FOREIGN PATENT DOCUMENTS

| CN | 105210154 A | 12/2015 |
| CN | 105518923 A | 4/2016 |
| CN | 109638347 A | 4/2019 |
| JP | H02-204312 A | 8/1990 |
| JP | 2012-176866 A | 9/2012 |
| JP | 2017-199631 A | 11/2017 |
| TW | 2015-11391 A | 3/2015 |
| WO | 2013-099834 A1 | 7/2013 |
| WO | 2013-145480 A1 | 10/2013 |

OTHER PUBLICATIONS

International Search Report (English and Japanese) of the International Searching Authority issued in PCT/JP2020/012095, dated Jun. 9, 2020; ISA/JP (5 pages).

* cited by examiner

*Primary Examiner* — James A Fiorito
(74) *Attorney, Agent, or Firm* — Harness, Dickey & Pierce, P.L.C.

(57) ABSTRACT

A method for producing a sulfide solid electrolyte includes a firing step of firing a raw material containing $Li_2S$ in a hydrogen sulfide-containing atmosphere at a temperature of 300° C. or higher, $Li_2S$ having a purity of 50 to 90% by mass at the start of firing. The $Li_2S$ may contain impurities including at least one of $LiOH$, $Li_2O$, $LiHCO_3$, and $Li_2CO_3$. In the firing step, it is preferable that a concentration of a hydrogen sulfide in the hydrogen sulfide-containing atmosphere is 50 volume % or more. It is preferable that the raw material further contains $P_2S_5$ and LiX (X represents at least one type of elemental halogen), and the sulfide solid electrolyte has an argyrodite-type crystal structure.

4 Claims, No Drawings

METHOD FOR PRODUCING SULFIDE SOLID ELECTROLYTE

CROSS REFERENCE TO RELATED APPLICATIONS

This application is a U.S. National Phase Application under 35 U.S.C. 371 of International Application No. PCT/JP2020/012095, filed on Mar. 18, 2020, which claims priority to Japanese Patent Application No. 2019-079731, filed on Apr. 19, 2019. The entire disclosures of the above applications are expressly incorporated by reference herein.

BACKGROUND

Technical Field

The present invention relates to a method for producing a sulfide solid electrolyte for suitable use as an electrolyte of a battery.

Related Art

Solid-state batteries do not use flammable organic solvents, and thus allow for simplification of safety devices. Moreover, solid-state batteries not only can be excellent in terms of production cost and productivity but also have the characteristic of being able to be stacked in series within a cell to achieve a higher voltage.

As a type of solid electrolyte that is used in a solid-state battery, a sulfide solid electrolyte has been researched. For example, JP 2017-199631A describes mixing a lithium sulfide and a phosphorus sulfide each having a purity of 90% or more, the sulfides being raw materials of a sulfide solid electrolyte, and subjecting the mixture to mechanical milling in an argon atmosphere, thereby obtaining a target material. For example, US 2016/156064A1 describes performing firing in hydrogen sulfide that is being circulated, thereby obtaining a sulfide solid electrolyte.

Conventionally, when producing a sulfide solid electrolyte, a sulfide having a high purity is used as a raw material in order to obtain a high lithium ionic conductivity and excellent battery characteristics. Thus, during preservation of a sulfide that is a raw material, it is necessary to take special care in order to avoid deterioration in the sulfide in the preservation environment. Accordingly, when producing a sulfide solid electrolyte, there are restrictions in that the processing has to be performed in a low dew point environment, and in that the room for selecting the raw material is narrow. This problem is serious in particular when mass-producing a sulfide solid electrolyte.

A raw material having a high purity is used according to the technique described in JP 2017-199631A, but, when the raw material comes into contact with air or the like by accident, moisture contained in the air causes deterioration in the raw material, and thus a solid electrolyte with a sufficient lithium ionic conductivity may not be obtained.

A solid electrolyte with a sufficient lithium ionic conductivity is obtained according to the technique described in US 2016/156064A1, but, when the raw material or the atmosphere during production is not sufficiently controlled, a problem as with JP 2017-199631A may occur.

Thus, it is an object of the present invention to provide a method for producing a sulfide solid electrolyte, the method enabling a sulfide solid electrolyte with a good lithium ionic conductivity to be obtained without using a raw material having a high purity.

SUMMARY

The present inventors found a new problem in that, in the case of using a raw material having a high purity when producing a sulfide solid electrolyte, it is difficult to preserve or control the raw material. Conventionally, an environment with a relatively low dew point temperature of −40° C. or lower is applied as an atmosphere for producing a sulfide solid electrolyte, but, when mass-producing a sulfide solid electrolyte, it is not realistic to maintain the above-mentioned atmosphere in the production processes. Thus, a new problem was found in that, when mass-producing a sulfide solid electrolyte, the desired atmosphere cannot be realized in the production processes, as a result of which it is difficult to use the raw material while maintaining the high purity thereof.

The present inventors conducted an in-depth study in order to address the above-described problems, and found that a sulfide solid electrolyte with a good lithium ionic conductivity can be obtained without using a raw material having a high purity. Specifically, it was found that, even when the purity decreases during preservation of the raw material due to impurities generated in the raw material by the preservation environment, it is possible to reduce the amount of impurities in the raw material by sulfurizing the impurities in the production processes. It was found that, since it is possible to reduce the amount of impurities in the raw material, the production processes do not have to be adjusted to an atmosphere with a dew point temperature of −40° C. or lower, for example, as in the case of producing a sulfide solid electrolyte using a raw material having a high purity.

The present invention was made based on these findings, and solves the above-described problems by providing a method for producing a sulfide solid electrolyte, comprising a firing step of firing a raw material containing $Li_2S$ in a hydrogen sulfide-containing atmosphere at a temperature of 300° C. or higher, $Li_2S$ having a purity of 50 to 90% by mass at the start of firing.

DETAILED DESCRIPTION

Hereinafter, the present invention will be described by way of preferred embodiments thereof. According to the production method of the present invention, a raw material for producing a sulfide solid electrolyte is fired in a hydrogen sulfide-containing atmosphere, so that a target sulfide solid electrolyte is obtained. Examples of the sulfide solid electrolyte include solid electrolytes containing elemental lithium (Li), elemental phosphorus (P), elemental sulfur (S), and the like. From the viewpoint of improving the lithium ionic conductivity, it is particularly preferable to use solid electrolytes containing elemental lithium, elemental phosphorus, elemental sulfur, and an elemental halogen. Such sulfide solid electrolytes may also contain another element in addition to elemental lithium, elemental phosphorus, elemental sulfur, and an elemental halogen. For example, a portion of elemental lithium may be replaced with another elemental alkali metal, a portion of elemental phosphorus may be replaced with another elemental pnictogen, and a portion of elemental sulfur may be replaced with another elemental chalcogen.

The above-described sulfide solid electrolytes are produced from a raw material that is a sulfide of an element constituting a sulfide solid electrolyte, such as a lithium sulfide and a phosphorus sulfide, and by firing a mixture obtained by mixing the sulfides and other raw materials.

Examples of the sulfide that can be used as a raw material include $Li_2S$, which is a lithium sulfide. Examples thereof further include $P_2S_5$, which is a phosphorus sulfide. Examples of the raw material other than the sulfides include halogenated lithium. Of these raw materials, $Li_2S$ is very likely to generate impurities through reaction with moisture in air. Examples of the substances that are likely to be generated as impurities include LiOH, $Li_2O$, and $LiHCO_3$ and $Li_2CO_3$ that are generated through reaction of LiOH or $Li_2O$ with $CO_2$ in air. Such impurities may impair the lithium ionic conductivity of a target sulfide solid electrolyte. Accordingly, the raw materials are strictly preserved and controlled so as not to generate these impurities in conventional cases.

On the other hand, the present inventors focused on the fact that, even when there are impurities in a raw material, it is possible to reduce the amount of impurities in the raw material by sulfurizing the impurities in the production processes. Accordingly, in the present invention, even when a raw material of a sulfide solid electrolyte has a purity that is lower than that in conventional examples, the lithium ionic conductivity of a target sulfide solid electrolyte is unlikely to be impaired. Specifically, in the present invention, even when $Li_2S$, which is one of the raw materials, has a low purity of 50 to 90% by mass at the start of firing, the lithium ionic conductivity of a target sulfide solid electrolyte is unlikely to be impaired. Examples of the sulfide that can be used as a raw material of a sulfide solid electrolyte include, not only $Li_2S$, but also $P_2S_5$ and the like as described above. The present invention focuses on $Li_2S$ because $Li_2S$ is a substance that is the most sensitive to moisture among raw materials of a sulfide solid electrolyte. The purity (% by mass) of $Li_2S$ can be expressed as [mass of $Li_2S$/(mass of $Li_2S$+mass of impurities)]×100.

When $Li_2S$ having a low purity is used, a sulfide solid electrolyte can be produced more economically than in the case in which $Li_2S$ having a high purity is used. The specific purity of $Li_2S$ having a low purity is preferably 90% by mass or less, and more preferably 80% by mass or less. Meanwhile, the specific purity of $Li_2S$ having a low purity is preferably 50% by mass or more, and more preferably 60% by mass or more. If the purity of $Li_2S$ is within the above-mentioned range, a sulfide solid electrolyte with a better lithium ionic conductivity can be obtained.

The above-mentioned purity of $Li_2S$ is a value at the start of firing of the raw material. The purity of $Li_2S$ at the start of firing of the raw material becomes as mentioned above mainly in the following cases (1) and (2).

Case (1) in which $Li_2S$ used as a raw material originally contains impurities and has a low purity. Case (2) in which, although $Li_2S$ having a high purity is used as a raw material, the purity of $Li_2S$ is ultimately lowered through contact of $Li_2S$ with moisture, oxygen, or carbon dioxide in any step before the start of firing.

Hereinafter, (1) and (2) will be described in detail.

In the case of the embodiment (1), during synthesis of $Li_2S$ for use as a raw material, impurities including at least one of LiOH, $Li_2O$, $LiHCO_3$, and $Li_2CO_3$ is mixed in $Li_2S$, and thus the purity of $Li_2S$ decreases. The $Li_2S$ having a low purity is used as a raw material of a sulfide solid electrolyte. Use of $Li_2S$ having a low purity as a raw material is advantageous from the economical point of view in that an inexpensive raw material can be used.

For example, it is possible to measure the purity of $Li_2S$ for use as a raw material, using a method that identifies an $Li_2S$ phase and an impurity phase using X-ray diffraction (XRD), and determines the contents of the components using Rietveld refinement. As another method, it is also possible to use a method that calculates the composition ratio using ICP atomic emission spectroscopy, a method that measures the concentrations of ion species derived from impurities, such as $CO_3^{2-}$ or $OH^-$, using ion chromatography, or the like. Of these, for the sake of simplicity, it is preferable to use a method that identifies an $Li_2S$ phase and an impurity phase using X-ray diffraction (XRD), and determines the contents of the components using Rietveld refinement.

In the case of the embodiment (2), $Li_2S$ having a high purity of 90% by mass or more is used as a raw material. This aspect cannot be said to be economically advantageous. However, in this embodiment, the dew point temperature in an atmosphere in an environment surrounding the raw material before firing does not have to be set to $-60°$ C. or lower. Accordingly, the atmosphere can be easily controlled, and the sulfide solid electrolyte can be mass-produced. It has been conventionally considered that, if the atmosphere of a surrounding environment for preserving $Li_2S$ as a raw material is not set to have a dew point temperature of $-60°$ C. or lower, the purity of $Li_2S$ originally having a high purity decreases, which has to be avoided. However, in the present invention, even when the purity of $Li_2S$ decreases due to generation of at least one of LiOH, $Li_2O$, $LiHCO_3$, and $Li_2CO_3$ through contact of $Li_2S$ with moisture, oxygen, or carbon dioxide during preservation, as described above, it is possible to effectively suppress impairment of the lithium ionic conductivity of a target sulfide solid electrolyte, by sulfurizing the impurities during firing.

A higher dew point temperature in an atmosphere in an environment surrounding the raw material during preservation of the raw materials, that is, before the start of firing is preferable because the control can be performed with ease. From this point of view, the dew point temperature is preferably set to $-40°$ C. or higher, and more preferably $-30°$ C. or higher. The dew point temperature may be set to, for example, $-20°$ C. or lower.

When weighing raw materials such as $Li_2S$, if the purity of $Li_2S$ is precisely seen as in (1) above, it is possible to produce a solid electrolyte with a higher lithium ionic conductivity, by adjusting the amounts of raw materials in advance so as to realize a stoichiometric composition considering the fact that impurities change into $Li_2S$ through sulfidation in the firing process. Meanwhile, when the purity of $Li_2S$ is ultimately lowered through contact of $Li_2S$ with moisture, oxygen, or carbon dioxide in any step before the start of firing as in (2) above, it is difficult to see an actual purity of $Li_2S$, and, furthermore, the lithium ionic conductivity is maintained as long as the composition of the solid electrolyte is not significantly different from the stoichiometric composition, and thus it is not absolutely necessary to adjust the amounts of raw materials.

A target sulfide solid electrolyte is obtained by preparing a mixture by mixing various raw materials such as $Li_2S$, and firing the mixture. The various raw materials may be mixed, for example, using various media mills such as a ball mill. The mixing may be performed in an atmosphere without moisture or in an atmosphere with moisture. The present invention is advantageous in that the mixing can be performed in an atmosphere with moisture as long as the purity of $Li_2S$ at the start of firing is within the above-described range. The term "atmosphere with moisture" may be, for example, an atmosphere with a dew point temperature of $-40°$ C. or higher or an atmosphere with a dew point temperature of $-30°$ C. or higher. Meanwhile, the term "atmosphere without moisture" may be, for example, an atmosphere with a dew point temperature in which $Li_2S$ or $P_2S_5$ as a sulfide raw material does not decompose and can be stably processed, and it is specifically a low dew point atmosphere with a dew point temperature of −60° C. or lower.

The mixing may be performed together with or without milling of a powder for use as a raw material, or may be performed through mechanical milling. If the mixing is performed through mechanical milling, the raw material powder may be glassified. Which type of mixing is to be performed can be selected as appropriate according to the performance and the like required for the target sulfide solid electrolyte.

The mixture is subjected to a firing process in a hydrogen sulfide-containing atmosphere. The hydrogen sulfide-containing atmosphere may be an atmosphere containing only a hydrogen sulfide, or an atmosphere containing a hydrogen sulfide and other gas. In either case, the firing is preferably performed in a hydrogen sulfide-containing atmosphere that is being circulated, because the pressure inside the kiln can be prevented from excessively increasing. The gas other than the hydrogen sulfide is preferably gas that is inert under a firing condition, and examples thereof include noble gas such as argon. The concentration of the gas other than the hydrogen sulfide in the hydrogen sulfide-containing atmosphere is not critical in the present invention, and may be adjusted according to the amounts of the raw materials and the flow rate of the hydrogen sulfide-containing atmosphere. Typically, the concentration of the hydrogen sulfide in the hydrogen sulfide-containing atmosphere under a firing condition is preferably 50 volume % or more, more preferably 75 volume % or more, and even more preferably 90 volume % or more, in order to produce the sulfide solid electrolyte at an industrially satisfactory productivity.

The firing temperature is one of the factors that affect the properties of the target sulfide solid electrolyte. As described above, in the present invention, at least one of LiOH, $Li_2O$, $LiHCO_3$, and $Li_2CO_3$ contained as impurities in $Li_2S$ is removed through sulfidation in the firing process. Accordingly, it is desirable that the firing temperature is high enough to sulfurize the impurities. The present inventors think that sulfidation of the impurities occurs when the hydrogen sulfide contained in the firing atmosphere thermally decomposes to hydrogen gas ($H_2$) and sulfur gas ($S_2$), and the thus generated sulfur gas acts on the impurities. Accordingly, it is also desirable that the firing temperature is high enough to allow the hydrogen sulfide to thermally decompose. The generation of sulfur gas is advantageous also from the viewpoint of increasing the partial pressure of sulfur gas in the firing atmosphere, thereby preventing sulfur from leaving the sulfide solid electrolyte. In consideration of these aspects, the firing temperature is preferably 300° C. or higher, more preferably 350° C. or higher, even more preferably 400° C. or higher, and even more preferably 450° C. or higher. There is no particular limitation on the upper limit value of the firing temperature, but, from the viewpoint of industrial productivity and economic efficiency, the temperature is preferably 700° C. or lower, more preferably 600° C. or lower, and even more preferably 550° C. or lower.

The firing time is not critical in the present invention, and any length of time is possible as long as a sulfide solid electrolyte with a target composition is obtained. Specifically, the firing time has preferably a length that allows a sulfidation reaction of the impurities and a solid state reaction of the raw material mixture to occur, and there is no particular limitation on the length of time. For example, the firing time may be 30 minutes or longer, 2 hours or longer, or 3 hours or longer. Meanwhile, for example, the firing time may be 10 hours or shorter, or 5 hours or shorter.

The thus obtained sulfide solid electrolyte is then subjected to the following processes such as milling, and is preferably used as a solid electrolyte of a battery. From the viewpoint of increasing the lithium ionic conductivity of the sulfide solid electrolyte even further, it is particularly preferable that the sulfide solid electrolyte having an argyrodite-type crystal structure is produced using raw materials containing $Li_2S$, $P_2S_5$, and LiX (X represents at least one type of elemental halogen).

The sulfide solid electrolyte of the present invention at room temperature, that is, 25° C. has a lithium ionic conductivity of preferably 3.5 mS/cm or more, more preferably 3.9 mS/cm or more, and even more preferably 4.0 mS/cm or more. The lithium ionic conductivity can be measured using the method described in the examples, which will be described later.

An argyrodite-type crystal structure refers to a crystal structure possessed by a group of compounds derived from a mineral represented by the chemical formula $Ag_8GeS_6$. From the viewpoint of improving the lithium ionic conductivity even further, it is particularly preferable that the sulfide solid electrolyte having an argyrodite-type crystal structure has a crystal structure belonging to that of cubic crystals.

In the sulfide solid electrolyte having an argyrodite-type crystal structure, for example, at least one of elemental fluorine (F), elemental chlorine (Cl), elemental bromine (Br), and elemental iodine (I) can be used as the elemental halogen contained in the sulfide solid electrolyte. From the viewpoint of improving lithium ionic conductivity, it is particularly preferable to use a combination of elemental chlorine and elemental bromine as the elemental halogen.

From the viewpoint of improving the lithium ionic conductivity even more, it is particularly preferable that the sulfide solid electrolyte having an argyrodite-type crystal structure is, for example, a compound represented by the compositional formula: $Li_{7-a-2b}PS_{6-a-b}X_a$ (X represents at least one type of elemental halogen). Examples of the elemental halogen in the compositional formula may include elemental fluorine (F), elemental chlorine (Cl), elemental bromine (Br), and elemental iodine (I), which may be used alone or in combination of two or more.

In the above-described compositional formula, a represents the molar ratio of elemental halogen (X) and is preferably from 0.4 to 2.2. When a is within this range, the cubic argyrodite-type crystal structure is stable at temperatures near room temperature (25° C.), and the lithium ionic conductivity can be increased. From this point of view, a is more preferably from 0.5 to 2.0, even more preferably from 0.6 to 1.8, and even more preferably from 0.7 to 1.6.

In the compositional formula, b represents a value indicating how much smaller the amount of the $Li_2S$ component is than that in the stoichiometric composition. It is preferable that $-0.9 \leq b \leq -a+2$, because the cubic argyrodite-type crystal structure is stable at temperatures near room temperature (25° C.) and the lithium ionic conductivity is increased. In particular, it is more preferable that $-a+0.4 \leq b$, and even more preferable that $-a+0.9 \leq b$, from the viewpoint of improving the moisture resistance of the cubic argyrodite-type crystal structure.

Whether or not a sulfide solid electrolyte has an argyrodite-type crystal structure can be confirmed by performing XRD measurement, for example. That is to say, in an X-ray diffraction pattern measured using an X-ray diffractometer (XRD) using CuKα1 radiation, a crystalline phase having an argyrodite-type structure has characteristic peaks at $2\theta=15.34°\pm1.00°$, $17.74°\pm1.00°$, $25.19°\pm1.00°$, $29.62°\pm1.00°$, $30.97°\pm1.00°$, $44.37°\pm1.00°$, $47.22°\pm1.00°$, and $51.70°\pm1.00°$. Furthermore, a crystalline phase having an argyrodite-type structure also has characteristic peaks at, for example, $2\theta=54.26°\pm1.00°$, $58.35°\pm1.00°$, $60.72°\pm1.00°$, $61.50°\pm1.00°$, $70.46°\pm1.00°$, and $72.61°\pm1.00°$. On the other hand, if a sulfide solid electrolyte does not contain a crystalline phase having an argyrodite-type structure, this can be confirmed by checking that the sulfide solid electrolyte does not have the above-described peaks characteristic of a crystalline phase having an argyrodite-type structure.

A sulfide solid electrolyte having an argyrodite-type crystal structure means that the sulfide solid electrolyte has at least a crystalline phase having an argyrodite-type structure. In the present invention, it is preferable that the sulfide solid electrolyte has a crystalline phase having an argyrodite-type structure as the main phase. At this time, the term "main phase" refers to a phase that occupies the largest proportion of the total amount of all of the crystalline phases constituting the sulfide solid electrolyte. Accordingly, the proportion of the crystalline phase having an argyrodite-type structure contained in the sulfide solid electrolyte to all of the crystalline phases constituting the sulfide solid electrolyte is, for example, preferably 60 mass % or more, or in particular, more preferably 70 mass % or more, 80 mass % or more, or 90 mass % or more. The proportion of a crystalline phase can be confirmed through XRD, for example.

The sulfide solid electrolyte obtained in this production method can be used, for example, as a material that constitutes a solid electrolyte layer or a material that is contained in an electrode mixture containing an active material. Specifically, the sulfide solid electrolyte can be used in a positive electrode mixture that contains a positive electrode active material and constitutes a positive electrode layer, or in a negative electrode mixture that contains a negative electrode active material and constitutes a negative electrode layer. Therefore, the sulfide solid electrolyte obtained in this production method can be used in a battery having a sulfide solid electrolyte layer, or a so-called solid-state battery. More specifically, the sulfide solid electrolyte can be used in a lithium solid-state battery. The lithium solid-state battery may be a primary battery or a secondary battery, but it is particularly preferable that the sulfide solid electrolyte is used in a lithium secondary battery. Note that the term "solid-state battery" encompasses, in addition to a solid-state battery that does not contain any liquid substance or gel substance as the electrolyte, a battery that contains a liquid substance or a gel substance as the electrolyte in an amount of, for example, 50 mass % or less, 30 mass % or less, or 10 mass % or less.

The above-described solid-state battery has a positive electrode layer, a negative electrode layer, and a solid electrolyte layer between the positive electrode layer and the negative electrode layer, and contains the sulfide solid electrolyte obtained in this production method. Examples of the shape of the solid-state battery include the shapes of laminate-type, cylindrical, and rectangular batteries.

The solid electrolyte layer can be produced using, for example, a method in which a slurry containing the sulfide solid electrolyte, a binder, and a solvent is dripped onto a substrate and leveled off with a doctor blade or the like, a method in which the substrate and the slurry are brought into contact with each other, followed by cutting with an air knife, and a method in which a coating is formed through screen printing or the like, and then the solvent is removed through heat drying. Alternatively, the sulfide solid electrolyte layer can also be produced by pressing a powder of the sulfide solid electrolyte and then performing appropriate processing. The solid electrolyte layer may also contain another solid electrolyte, in addition to the sulfide solid electrolyte obtained in this production method. Typically, the thickness of the solid electrolyte layer is preferably from 5 to 300 µm, and more preferably from 10 to 100 µm.

The positive electrode mixture in the solid-state battery that contains the sulfide solid electrolyte obtained in this production method contains a positive electrode active material. As the positive electrode active material, for example, a material that is used as a positive electrode active material in a lithium secondary battery can be used as appropriate. Examples of the positive electrode active material include a spinel-type lithium transition metal compound, a lithium metal oxide having a layered structure, and the like. The positive electrode mixture may also contain other materials, including a conductive assistant, in addition to the positive electrode active material.

The negative electrode mixture in the solid-state battery that contains the sulfide solid electrolyte obtained in this production method contains a negative electrode active material. As the negative electrode active material, for example, a negative electrode mixture that is used as a negative electrode active material in a lithium secondary battery can be used as appropriate. Examples of such a negative electrode active material include lithium metals, carbon materials such as artificial graphite, natural graphite, and non-graphitizable carbon (hard carbon), silicon, silicon compounds, tin, tin compounds, and the like. The negative electrode mixture may also contain other materials, including a conductive assistant, in addition to the negative electrode active material.

EXAMPLES

Hereinafter, the present invention will be described in greater detail by means of examples. However, the scope of the present invention is not limited to the examples below. In the following description, "%" means "% by mass" unless otherwise specified.

Example 1

As raw material powders, an $Li_2S$ powder, a $P_2S_5$ powder, an LiCl powder, and an LiBr powder were used. These powders were weighed such that the composition $Li_{5.4}PS_{4.4}Cl_{0.8}Br_{0.8}$ was realized and such that the total amount of the powders was 5 g. As the $Li_2S$ powder, a model raw material powder obtained by mixing an $Li_2S$ reagent having a purity of 99.9% and an LiOH reagent having a purity of 99.5% to the purity shown in Table 1 was used. The raw material powders were ground and mixed using a ball mill to obtain a powder mixture. Then, the powder mixture was fired. The firing was performed in an atmosphere of 100% hydrogen sulfide gas that was being circulated. The flow rate was set to 100 cm$^3$/min. The firing temperature was set to 500° C., and the firing time was set to 8 hours. In this manner, a sulfide solid electrolyte having an argyrodite-type crystal structure was obtained. It was confirmed through XRD measurement that the sulfide solid electrolyte had an argyrodite-type crystal structure.

Comparative Example 1

As the firing atmosphere, 100% argon gas was used. A sulfide solid electrolyte having an argyrodite-type crystal structure was obtained in a similar way to that of Example 1, except for the above-mentioned aspect.

Example 2

The purity of $Li_2S$ was set to a value shown in Table 1. A sulfide solid electrolyte having an argyrodite-type crystal structure was obtained in a similar way to that of Example 1, except for the above-mentioned aspect.

Comparative Example 2

As the firing atmosphere, 100% argon gas was used. A sulfide solid electrolyte having an argyrodite-type crystal structure was obtained in a similar way to that of Example 2, except for the above-mentioned aspect.

Example 3

As the raw material powder of $Li_2S$, a model powder having a purity shown in Table 1 and containing $Li_2O$ as impurities was used. A sulfide solid electrolyte having an argyrodite-type crystal structure was obtained in a similar way to that of Example 1, except for the above-mentioned aspect.

Comparative Example 3

As the firing atmosphere, 100% argon gas was used. A sulfide solid electrolyte having an argyrodite-type crystal structure was obtained in a similar way to that of Example 3, except for the above-mentioned aspect.

Evaluation

The lithium ionic conductivities of the sulfide solid electrolytes obtained in the examples and the comparative examples were measured using the following method. Table 1 below shows the results.

Measurement of Lithium Ionic Conductivity

The sulfide solid electrolytes obtained in the examples and the comparative examples were shaped through uniaxial pressing within a glove box purged with a sufficiently dried Ar gas (having a dew point of −60° C. or lower). Then, pellets with a diameter of 10 mm and a thickness of about 4 to 5 mm were formed at 200 MPa using a cold isostatic pressing machine. A sample for measuring the lithium ionic conductivity was formed by applying carbon paste as electrodes to the upper and lower faces of the pellets, and then performing heat treatment at 180° C. for 30 minutes. The lithium ionic conductivity of the sample was measured using a Solartron 1255B manufactured by Toyo Corporation. The measurement was performed using an AC impedance method under conditions at a temperature of 25° C. and over a frequency range from 0.1 Hz to 1 MHz.

TABLE 1

| | Purity of $Li_2S$ (%) | Impurity | Firing atmosphere | Firing temperature (° C.) | Lithium ionic conductivity (mS/cm) |
|---|---|---|---|---|---|
| Ex. 1 | 78 | LiOH | $H_2S$ | 500 | 4.09 |
| Com. Ex. 1 | 78 | LiOH | Ar | 500 | 3.29 |
| Ex. 2 | 57 | LiOH | $H_2S$ | 500 | 1.45 |
| Com. Ex. 2 | 57 | LiOH | Ar | 500 | 0.96 |
| Ex. 3 | 85 | $Li_2O$ | $H_2S$ | 500 | 4.79 |
| Com. Ex. 3 | 85 | $Li_2O$ | Ar | 500 | 3.89 |

As is clear from the results shown in Table 1, the sulfide solid electrolytes obtained in Examples 1 to 3 have lithium ionic conductivities that are higher than those obtained in corresponding Comparative Examples 1 to 3, although impurities are contained in $Li_2S$ as a raw material thereof.

INDUSTRIAL APPLICABILITY

As described above in detail, according to the present invention, it is possible to obtain a sulfide solid electrolyte with a good lithium ionic conductivity, without using a raw material having a high purity. Accordingly, the production method of the present invention is advantageous in terms of mass production and economic efficiency.

The invention claimed is:

1. A method for producing a sulfide solid electrolyte, comprising:
    a mixing step of mixing a raw material containing $Li_2S$ and a phosphorus sulfide; and
    a firing step of firing the raw material in a hydrogen sulfide-containing atmosphere at a temperature of 300° C. or higher, the $Li_2S$ having a purity of 50 to 90% by mass at the a start of the firing.

2. The method for producing a sulfide solid electrolyte according to claim 1, wherein the $Li_2S$ contains impurities including at least one of LiOH, $Li_2O$, $LiHCO_3$, and $Li_2CO_3$.

3. The method for producing a sulfide solid electrolyte according to claim 1, wherein, in the firing step, a concentration of a hydrogen sulfide in the hydrogen sulfide-containing atmosphere is 50 volume % or more.

4. The method for producing a sulfide solid electrolyte according to claim 1,
    wherein the raw material further contains LiX (X represents at least one type of elemental halogen), and
    the sulfide solid electrolyte has an argyrodite-type crystal structure.

\* \* \* \* \*